United States Patent
Squires et al.

(10) Patent No.: US 9,177,111 B1
(45) Date of Patent: Nov. 3, 2015

(54) SYSTEMS AND METHODS FOR PROTECTING SOFTWARE

(75) Inventors: Christopher J. Squires, Westminster, CO (US); Jeffrey G. Reh, Longmont, CO (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 2315 days.

(21) Appl. No.: 11/599,656

(22) Filed: Nov. 14, 2006

(51) Int. Cl.
*G06F 21/00* (2013.01)

(52) U.S. Cl.
CPC .................................... *G06F 21/00* (2013.01)

(58) Field of Classification Search
None
See application file for complete search history.

(56) References Cited

U.S. PATENT DOCUMENTS

| | | | |
|---|---|---|---|
| 3,916,112 A | | 10/1975 | Kalat et al. |
| 4,531,024 A | * | 7/1985 | Colton et al. ............... 379/93.14 |
| 4,562,305 A | * | 12/1985 | Gaffney, Jr. .................... 713/190 |
| 5,388,156 A | | 2/1995 | Blackledge, Jr. et al. |
| 5,854,938 A | | 12/1998 | Ogi |
| 6,012,146 A | | 1/2000 | Liebenow |
| 6,229,712 B1 | | 5/2001 | Munoz-Bustamante et al. |
| 6,601,175 B1 | | 7/2003 | Arnold et al. |
| 6,990,658 B1 | | 1/2006 | Torvalds et al. |
| 6,996,725 B2 | | 2/2006 | Ma et al. |
| 7,353,542 B2 | | 4/2008 | Shiga et al. |
| 2003/0084316 A1 | | 5/2003 | Schwartz |
| 2003/0202199 A1 | | 10/2003 | Carter et al. |
| 2003/0212911 A1 | | 11/2003 | Challener et al. |
| 2004/0073735 A1 | * | 4/2004 | Boom et al. .................. 710/260 |
| 2004/0172369 A1 | | 9/2004 | Persson |
| 2004/0250104 A1 | | 12/2004 | Handa et al. |
| 2005/0108525 A1 | | 5/2005 | Nason et al. |
| 2005/0251653 A1 | | 11/2005 | Coon et al. |
| 2006/0242068 A1 | | 10/2006 | Jogand-Coulomb et al. |
| 2007/0168292 A1 | | 7/2007 | Jogand-Coulomb et al. |

FOREIGN PATENT DOCUMENTS

EP     0593305     4/1994

* cited by examiner

*Primary Examiner* — David Le
*Assistant Examiner* — Devin Almeida (57) ABSTRACT

A software protection system comprises a memory system and a microprocessing system. The memory system is configured to store a software program comprised of a plurality of program instructions that, when executed, have a program order. The microprocessing system is coupled to the memory system and is configured to, when executing the software program, determine a next program instruction of the plurality of program instructions in the program order based on an order identifier, fetch the next program instruction from the memory system, determine if the next program instruction requires decrypting, decrypt the next program instruction responsive to determining that the next program instruction requires decrypting, and execute the next program instruction.

18 Claims, 11 Drawing Sheets

| PROGRAM INSTRUCTION | | | | | | | | | | | | | | | |
|---|---|---|---|---|---|---|---|---|---|---|---|---|---|---|---|
| OPCODE | | | | | | | | OPERAND | | | | | | | |
| E | B | B | B | B | B | B | B | B | B | B | B | B | B | B | B |

302

| | PROGRAM INSTRUCTION | | | | | | | | | | | | | | | |
|---|---|---|---|---|---|---|---|---|---|---|---|---|---|---|---|---|
| FLAG | OPCODE | | | | | | | | OPERAND | | | | | | | |
| E/U | B | B | B | B | B | B | B | B | B | B | B | B | B | B | B | B |

SYSTEMS AND METHODS FOR PROTECTING SOFTWARE

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The field of the invention relates to software protection technologies.

2. Description of the Prior Art

Computing security has increased in importance as security threats have become ubiquitous. In particular, software protection has gained importance as software piracy has become commonplace.

Often times, software applications are encrypted in order to prevent unauthorized use. Under authorized circumstances, the software is decrypted prior to run-time, much like a data file would typically be decrypted. However, once a software application is decrypted, the application resides in memory in an unencrypted and vulnerable state.

One prior art solution that seeks to avoid this problem is to decrypt at run-time the program instructions that constitute a software application. Specifically, encrypted program instructions are fetched from memory by a microprocessor for execution by the microprocessor. A decryption module within the microprocessor decrypts the program instructions. The decrypted program instructions are then passed to other elements of the microprocessor for execution. Problematically, this prior art approach limits the microprocessor to executing encrypted software applications.

SUMMARY OF THE INVENTION

An embodiment of the invention helps solve the above problems and other problems by providing systems and methods for dynamically decrypting program instructions that require decrypting. In an embodiment of the invention, a software protection system comprises a memory system and a microprocessing system. The memory system is configured to store a software program comprised of a plurality of program instructions that, when executed, have a program order. The microprocessing system is coupled to the memory system and is configured to, when executing the software program, determine a next program instruction of the plurality of program instructions in the program order based on an order identifier, fetch the next program instruction from the memory system, determine if the next program instruction requires decrypting, decrypt the next program instruction responsive to determining that the next program instruction requires decrypting, and execute the next program instruction.

In an embodiment of the invention, a first program instruction of the plurality of program instructions comprises an encryption flag indicating whether the software program is encrypted or unencrypted.

In an embodiment of the invention, the microprocessing system is configured to determine if the next program instruction requires decrypting based on the encryption flag.

In an embodiment of the invention, each of the plurality of program instructions comprise an opcode and an operand.

In an embodiment of the invention, the opcode includes an encryption flag that indicates whether each of the plurality of program instructions are either encrypted or unencrypted.

In an embodiment of the invention, the microprocessing system is configured to determine if the next program instruction requires decrypting based on the encryption flag.

In an embodiment of the invention, the microprocessing system is configured to process the opcode with a template having a set of unencrypted opcodes to determine if the next program instruction requires decrypting.

In an embodiment of the invention, the next program instruction does not require decrypting if the opcode is in the set of unencrypted opcodes.

In an embodiment of the invention, the next program instruction requires decrypting if the opcode is not in the set of unencrypted opcodes.

In an embodiment of the invention, a method of operating a software protection system comprises storing in a memory system a software program comprised of a plurality of program instructions that, when executed, have a program sequence, and when executing the software program in a microprocessing system, determining in a microprocessing system a next program instruction of the plurality of program instructions in the program sequence based on a sequence identifier, fetching the next program instruction from the memory system, determining if the next program instruction requires decrypting, decrypting the next program instruction responsive to determining that the next program instruction requires decrypting, and executing the next program instruction.

In an embodiment of the invention, a microprocessing system for executing a software program comprised of a plurality of program instructions that, when executed, have a program order, comprises and interface and a processing system. The interface is configured to read from a memory a next program instruction of the plurality of program instructions in the program order based on an order identifier. The processing system is coupled to the interface and is configured to determine the next program instruction, determine if the next program instruction requires decrypting, decrypt the next program instruction responsive to determining that the next program instruction requires decrypting, and execute the next program instruction.

In an embodiment of the invention, a method of operating a microprocessing system for executing a software program comprised of a plurality of program instructions that, when executed, have a program order, comprises determining a next program instruction of the plurality of program instructions in the program order based on an order identifier from a memory a next program instruction, reading the next program instruction from a memory, processing the next program instruction to determine if the next program instruction requires decrypting, decrypting the next program instruction responsive to determining that the next program instruction requires decrypting, and executing the next program instruction.

BRIEF DESCRIPTION OF THE DRAWINGS

The same reference number represents the same element on all drawings.

DETAILED DESCRIPTION OF THE PREFERRED EMBODIMENT

FIGS. 1-11 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
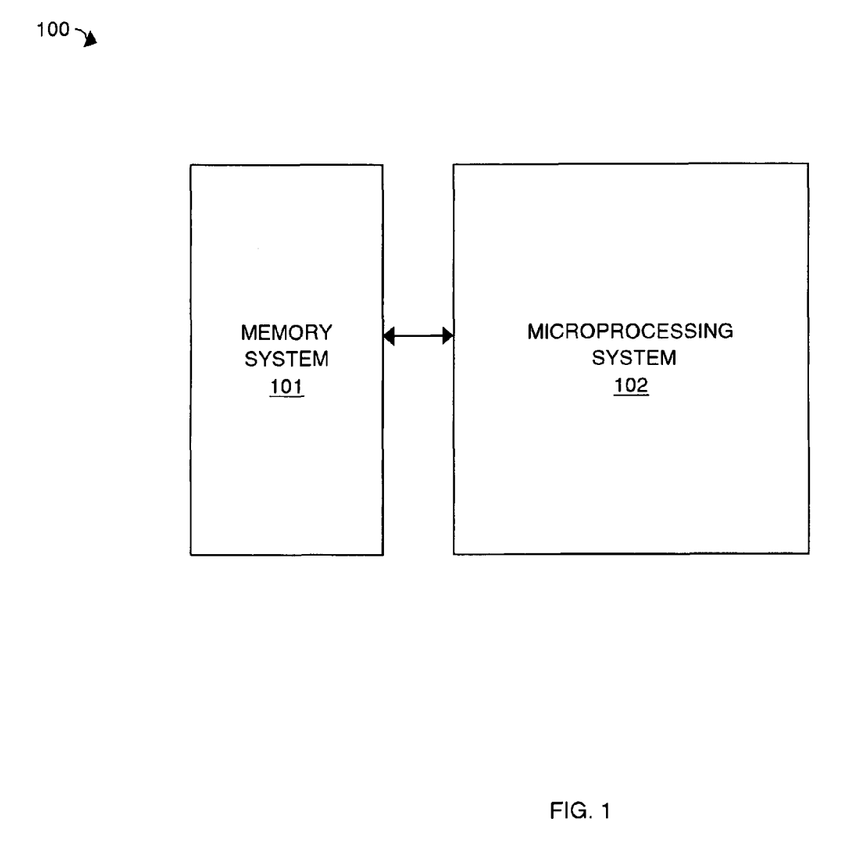
FIG. 1 illustrates a software protection system in an embodiment of the invention.

FIG. 1 illustrates a simplified block diagram of a software protection system 100 in an embodiment of the invention. Software protection system 100 includes memory system 101 and microprocessing unit 102. Microprocessing unit 102 is in communication with or otherwise operatively coupled to memory system 101. An interface, bus, or other such well known logical and/or physical link could couple microprocessing system 102 and memory system 101.

Memory system 101 could be any memory system or collection of memory systems capable of storing software programs executable by microprocessing unit 102. Examples of memory systems include disk, tape, optical, integrated circuit, or server memory systems. Memory system 101 could be a local or external memory system. In an example, memory system 101 could comprise a random access memory, a hard drive, a cache memory, a flash memory, or a read-only memory, or any combination thereof. The software programs could be, for example, operating system, application, utility, networking, or driver programs, as well as other types of programs. The software programs could be comprised of program instructions executable by microprocessing unit 102. Most often, the programs could be in the form of an executable file. Often times, the software programs are stored in a binary representation of machine instructions executable by microprocessing unit 102. It should be understood that the programs could be stored in an intermediate form that could require the services of an interpreter.

Microprocessing unit 102 comprises any system, module, or collection of systems or modules capable of processing software programs stored on memory system 101 to execute the software programs. Microprocessing unit 102 could be a programmable general purpose processing system, such as a central processing unit (CPU). In another example, microprocessing unit 102 could be an application specific processing system. Microprocessing unit 102 could be comprised of an integrated circuit or collection of integrated circuits.

In operation, microprocessing system 102 retrieves program instructions from memory system 101 for processing and execution. Typically, a software program contains a logical execution order and microprocessing system 102 retrieves, processes, and executes the program instructions according to the order. Microprocessing system 102 could execute the program instructions one after another. However, microprocessing system 102 could also execute several program instructions at once. Often times, a series of program instructions are executed sequentially. However, it is also well known that program instructions can cause jumps to other program instructions other than the following program instruction, as well as other operations that cause a program to execute in a non-sequential fashion.

An order identifier located in microprocessing system 102 is frequently used to track, point to, or otherwise indicate the current place or location of a program in its execution order. A program counter is an example of an order identifier. Often times, a program counter points to an address location in memory system 101 that stores or holds the next program instruction to be fetched by microprocessing system 102. In some cases, the program counter contains a value offset by a variable or constant amount. The program counter directs microprocessing system 102 from where to retrieve the next program instruction.

Figure 2:
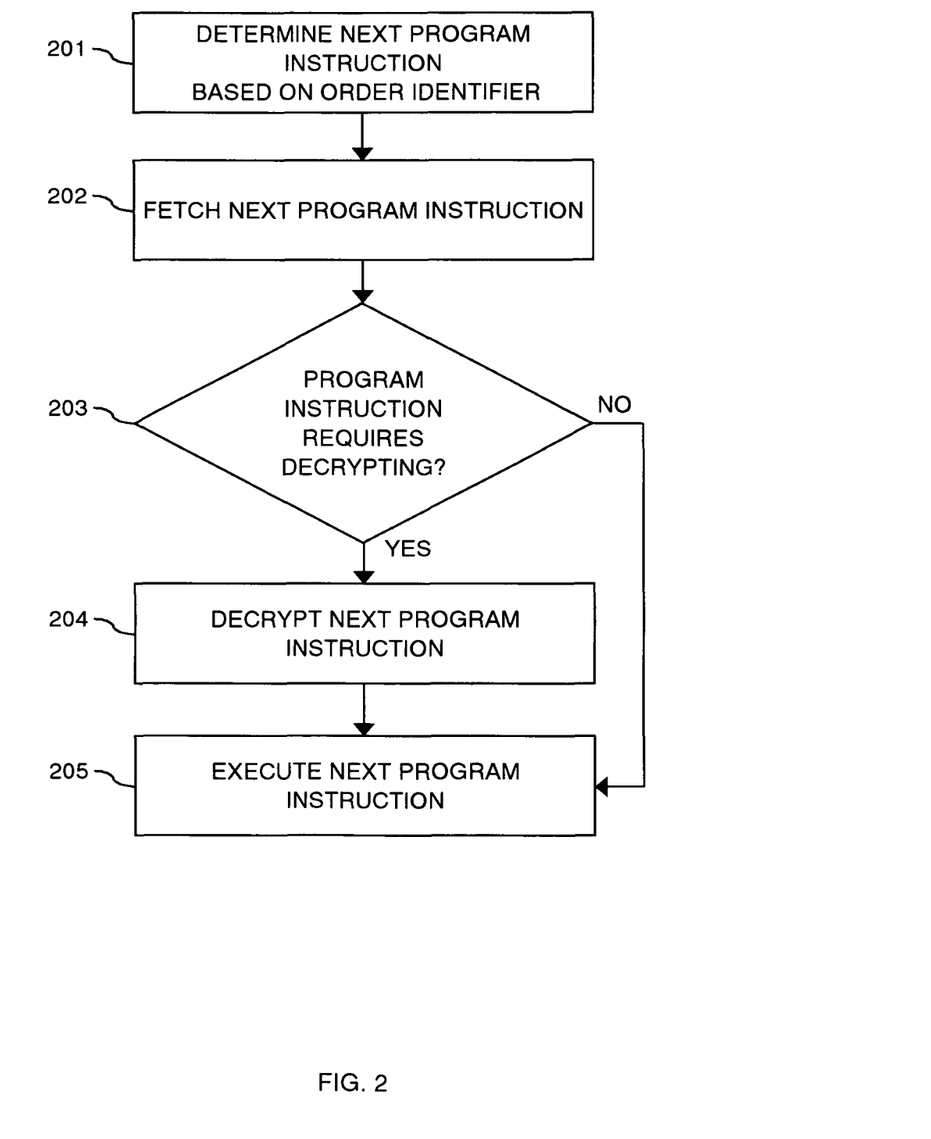
FIG. 2 illustrates the operation of a microprocessing system in an embodiment of the invention.

FIG. 2 is a flow chart illustrating a protection process in an embodiment of the invention. To begin, memory system 101 stores a software program comprised of a plurality of program instructions that, when executed, have a program order. As illustrated in FIG. 1, microprocessing system 102 is coupled to memory system 101 and is configured to, when executing the software program, determine a next program instruction of the plurality of program instructions in the program order based on an order identifier (Step 201). Next, microprocessing system 102 fetches the next program instruction from memory system 101 (Step 202). Microprocessing system 102 determines if the program instruction requires decrypting (Step 203). If the program instruction requires decrypting, microprocessing system 102 decrypts the program instruction (Step 204). After decrypting the program instruction, microprocessing system 102 executes the program instruction. If the program instruction does not require decryption, microprocessing system 102 bypasses Step 204 and executes the program instruction (Step 205).

Figure 3:
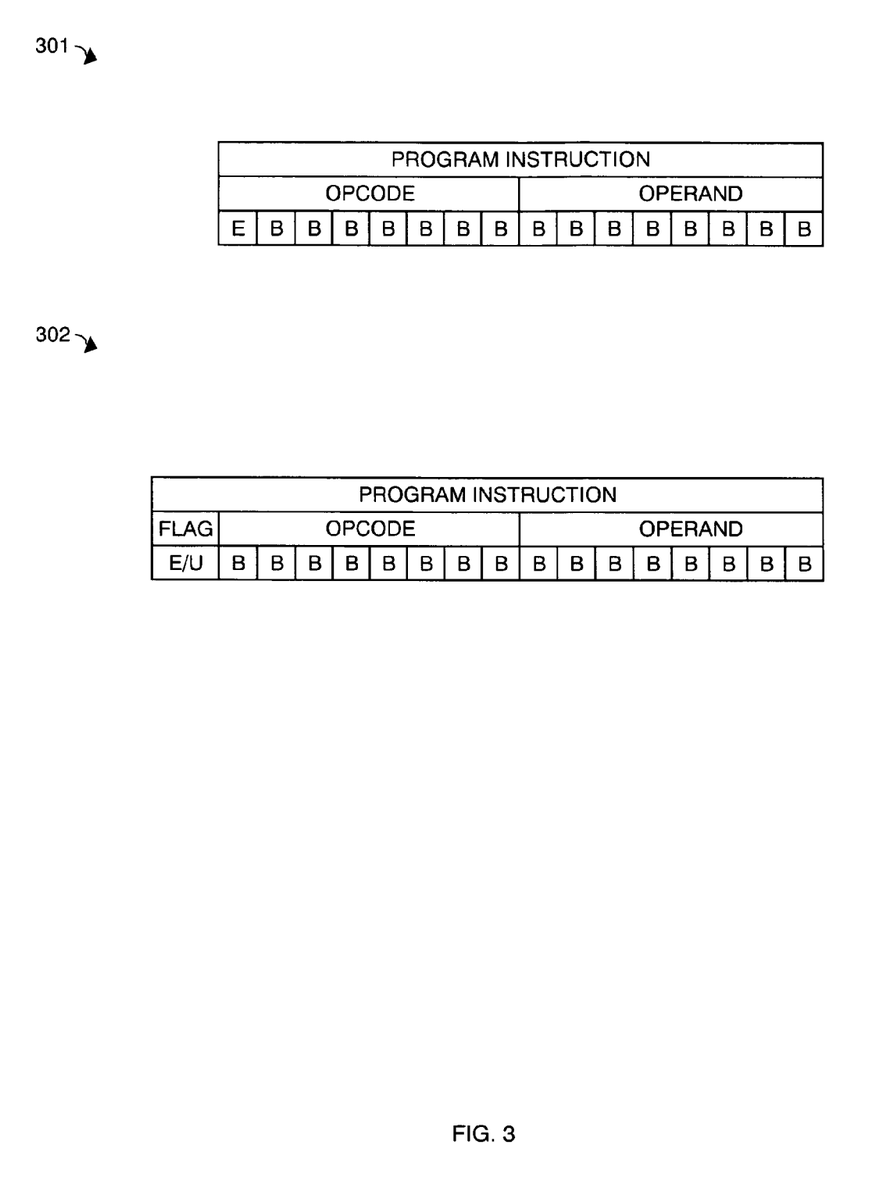
FIG. 3 illustrates program instructions in an embodiment of the invention.

FIG. 3 illustrates program instructions 301 and 302 in embodiments of the invention. As illustrated in FIG. 3, program instruction 301 includes an opcode and an operand. The opcode and operand of program instruction 301 each include a number of bits. The opcode and operand in program instruction 301 are illustrated has having eight bits for illustrative purposes. It should be understood that the opcode and operand of program instruction 301 could each include more or less than eight bits.

As further illustrated in FIG. 3, program instruction 302 includes an opcode, an operand, and an encryption state flag. It should be understood that the encryption state flag could be integrated with either the opcode or operand. The opcode, operand, and encryption flag of program instruction 301 each include a number of bits. The opcode and operand in program instruction 301 are illustrated has having one byte for illustrative purposes. It should be understood that the opcode and operand could each include more than one byte. The encryption flag is illustrated as having one bit, but it should be understood that the encryption flag could have more than one bit.

It should be understood that program instructions 301 and 302 could be encrypted using various well known encryption processes. For example, an exclusive OR function (XOR) could be applied to program instruction 301 or 302 with a key. The key could be a software or hardware based key. In one example, the key could be hard-coded internally to microprocessing system 102. For instance, the key could be generated prior to a manufacturing process for manufacturing microprocessing system 102 or other elements within microprocessing system 102. The key could then be hard coded or otherwise physically integrated within microprocessing system 102. Other, more elaborate encryption processes could also be utilized, such as the digital encryption standard (DES) or triple-DES. Other encryption processes are possible. The program instructions of a software program, such as program instruction 301, could be encrypted using one of the aforementioned processes. At run-time the program instructions could then be decrypted when called from memory system 101 for execution. In some cases, the same key or a corresponding key stored internally to microprocessing system 102 could be utilized to decrypt program instructions. In an example, the key could be hard coded internally to microprocessing system 102.

Microprocessing system 102 could be capable of operating in either a decryption mode or a non-decryption mode, as some software programs or program instructions may be encrypted, while others may not be encrypted.

In an embodiment, microprocessing system 102 could capable of determining its state or mode on a per-program instruction basis. For instance, a program instruction could include a flag set to indicate that the program instruction is either encrypted or unencrypted. In another example, the opcode of each program instruction could be analyzed to determine whether or not the opcode matches at least one of a group of opcode templates. Depending upon the result, it could be determined that the program instruction is either encrypted or decrypted. Other variations are possible.

In another embodiment, microprocessing system 102 could be capable of determining its state or mode on a per-software program or per-module basis. For example, an early program instruction of a software program being executed could indicate whether or not the software program as a whole is encrypted or unencrypted.

It should be understood that in some examples microprocessing system 102 could operate under the assumption that every software program or every program instruction is encrypted and therefore requires decrypting.

Figure 4:
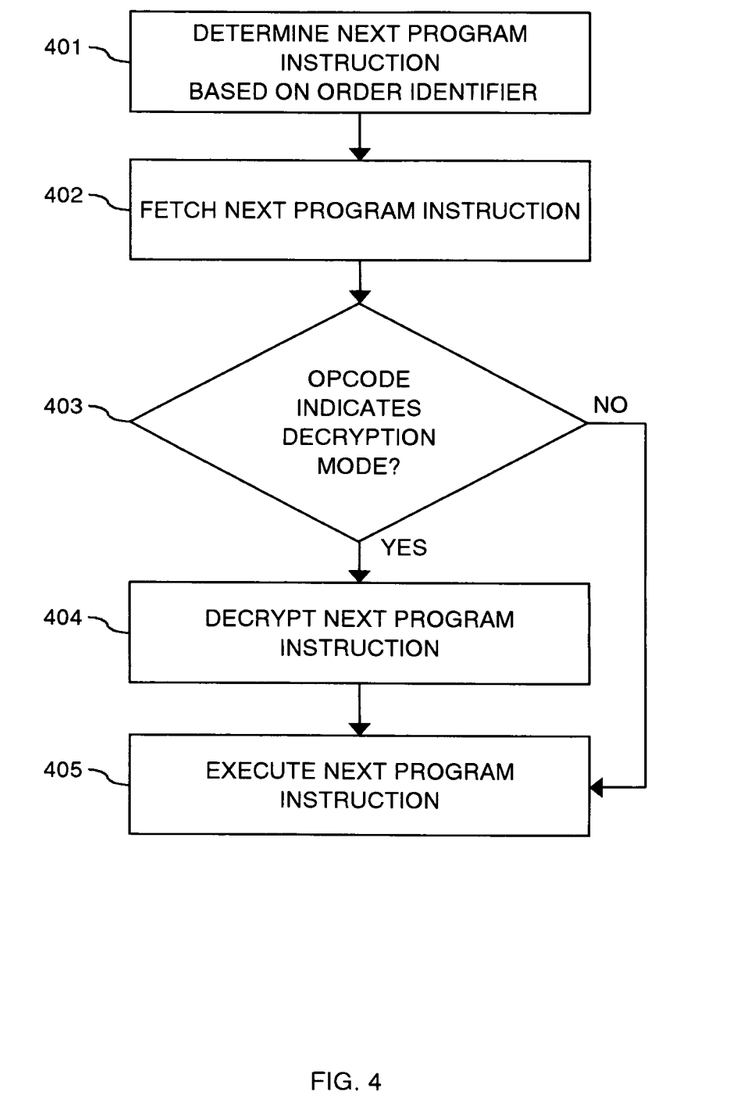
FIG. 4 illustrates the operation of a microprocessing system in an embodiment of the invention.

In FIG. 4, an illustration of the operation of microprocessing system 102 with respect to program instruction 301 is provided. Referring to FIG. 4, microprocessing system 102 determines the next program instruction based on an order identifier (Step 401). Next, microprocessing system 102 fetches the next program instruction from memory system 101 (Step 402). It should be understood that microprocessing system 102 could include pre-fetch processes that are well known in the art. Thus, Step 402 could include a pre-fetch process.

Microprocessing system 102 then processes the program instruction to determine the encryption mode (Step 403). In one example, the opcode could be a new opcode that instructs microprocessing system 102 to enter into a decryption mode. For every program instruction thereafter, microprocessing system 102 could decrypt the program instruction (Step 404) and then execute the decrypted program instruction (Step 405). A subsequent program instruction could have an opcode instructing microprocessing system 102 to exit the decryption mode. For every program instruction thereafter, Step 404 could be bypassed and the program instruction executed by microprocessing system 102 (Step 405).

Figure 5:
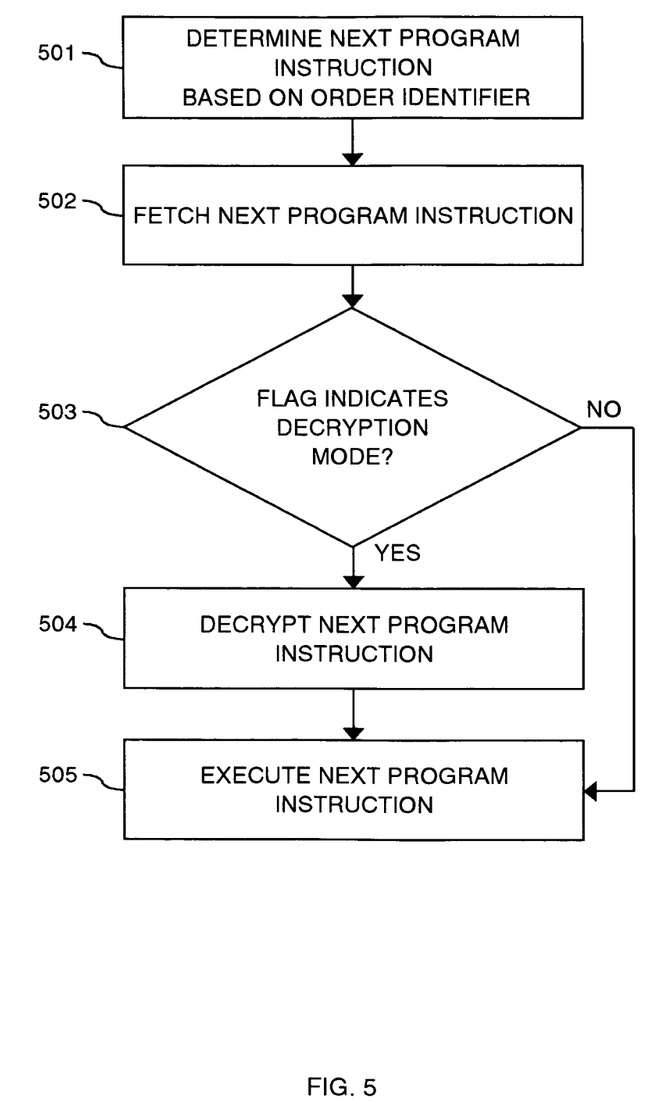
FIG. 5 illustrates the operation of a microprocessing system in an embodiment of the invention.

In FIG. 5, an illustration of the operation of microprocessing system 102 with respect to program instruction 302 is provided. Referring to FIG. 5, microprocessing system 102 determines the next program instruction based on an order identifier (Step 501). Next, microprocessing system 102 fetches the next program instruction from memory system 101 (Step 502). It should be understood that microprocessing system 102 could include pre-fetch processes that are well known in the art. Thus, Step 405 could include a pre-fetch process.

Microprocessing system 102 then processes the program instruction to determine the encryption mode based on a flag set in the opcode of the program instructions. As illustrated in FIG. 3, the flag in program instruction 302 is the left most bit of the opcode. It should be understood that the flag could a different bit or group of multiple bits in either the opcode or even the operand.

In one example, the flag could represent an encrypted state of the program instruction. In such an example, each program instruction would be processed to determine the state of each program instruction. If a flag indicates that the program instruction is encrypted (Step 503), then the program instruction is decrypted (Step 504). After decryption, the program instruction is executed. If the flag indicates that the program instruction is not encrypted, then the decryption step is bypassed and the program instruction is executed (Step 504).

In another example, the flag could represent that a particular software program as a whole, or a section or subset of a software program, is encrypted. The flag could place microprocessing system 102 into a decryption mode while the software program is being executed. In the event of an interrupt by another program, the mode of the previous program could be pushed onto a stack. Once the previous program is again current and being executed, the mode could be popped off the stack. Microprocessing system 102 could then operate in accordance with the mode, such as in a decryption mode or a normal mode.

Figure 6:
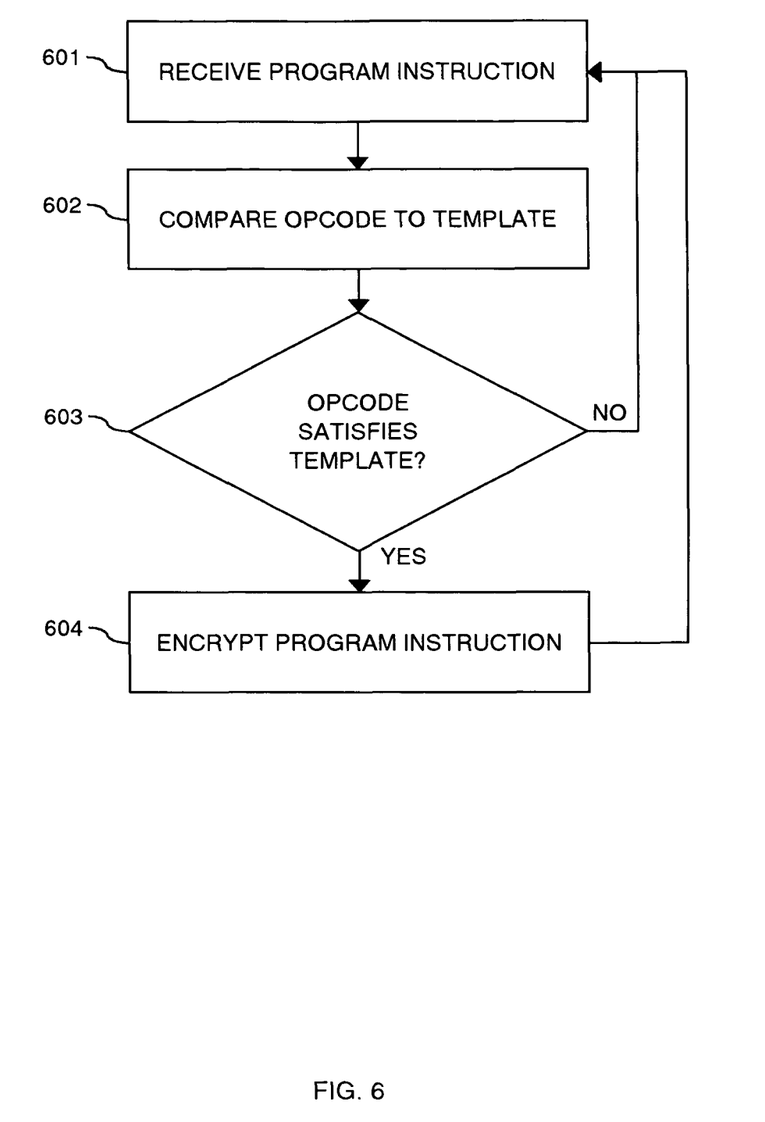
FIG. 6 illustrates an encryption process in an embodiment of the invention.

In FIG. 6, an encryption process is illustrated for encrypting program instructions on a per-program instruction basis. In this example, a program instruction is encrypted if the opcode of the program instruction does not match at least one opcode included in an opcode template. The program instructions having opcodes that match at least one opcode in an opcode template remain unencrypted. A software program could be encrypted on a per-program instruction basis prior to loading onto memory system 101. At run-time, microprocessing system 102 could retrieve and decrypt the program instructions of the software program on a per-program instruction basis, and based on the opcodes of the program instructions.

Referring to FIG. 6, program instructions are received into the encryption process (Step 601). Next, each opcode of each program instruction is compared to an opcode template having several unencrypted opcodes. If the subject opcode satisfies the template (Step 603), the opcode is encrypted. The encryption then process continues for the remaining program instructions. If the opcode does not satisfy the template, the encryption step (Step 603) is bypassed and the encryption process continues for the remaining program instructions.

Figure 7:
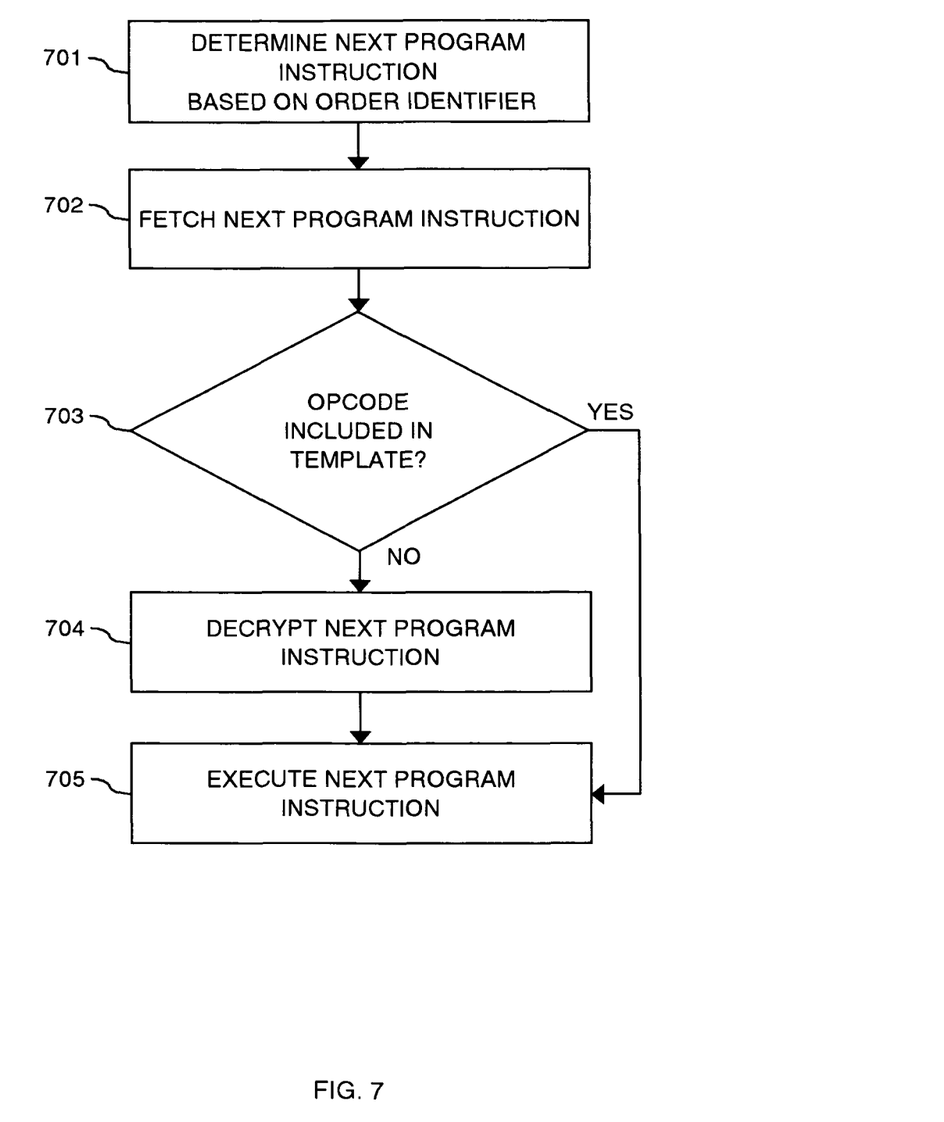
FIG. 7 illustrates the operation of a microprocessing system in an embodiment of the invention.

In FIG. 7, another illustration of the operation of microprocessing system 102 with respect to program instruction 301 and the encryption process of FIG. 6 is provided. Referring to FIG. 7, microprocessing system 102 determines the next program instruction based on an order identifier (Step 701). Next, microprocessing system 102 fetches the next program instruction from memory system 101 (Step 702). It should be understood that microprocessing system 102 could include pre-fetch processes that are well known in the art. Thus, Step 702 could include a pre-fetch process.

Microprocessing system 102 then processes the program instruction to determine whether or not the opcode in the program instruction is included in a template having a group of opcodes (Step 703). The template could be stored in a memory location within microprocessing system 102, such as on a register or registers, cache memory, or the like. The template could include a group of opcodes in an unencrypted state. The program instructions fetched from memory system 101 could be part of a software program previously encrypted by an encryption process, such as the process described in FIG. 6. The encryption process could encrypt the software program on an opcode by opcode basis. For instance, some program instructions could be encrypted based on the opcode, while other program instructions having different opcodes could remain unencrypted.

If the opcode is not in the template, then microprocessing system 102 could decrypt the program instruction (704) and then execute the program instruction (Step 705). If the opcode is in the template, then the decryption step (Step 704) could be bypassed and the program instruction executed (Step 705).

Figure 8:
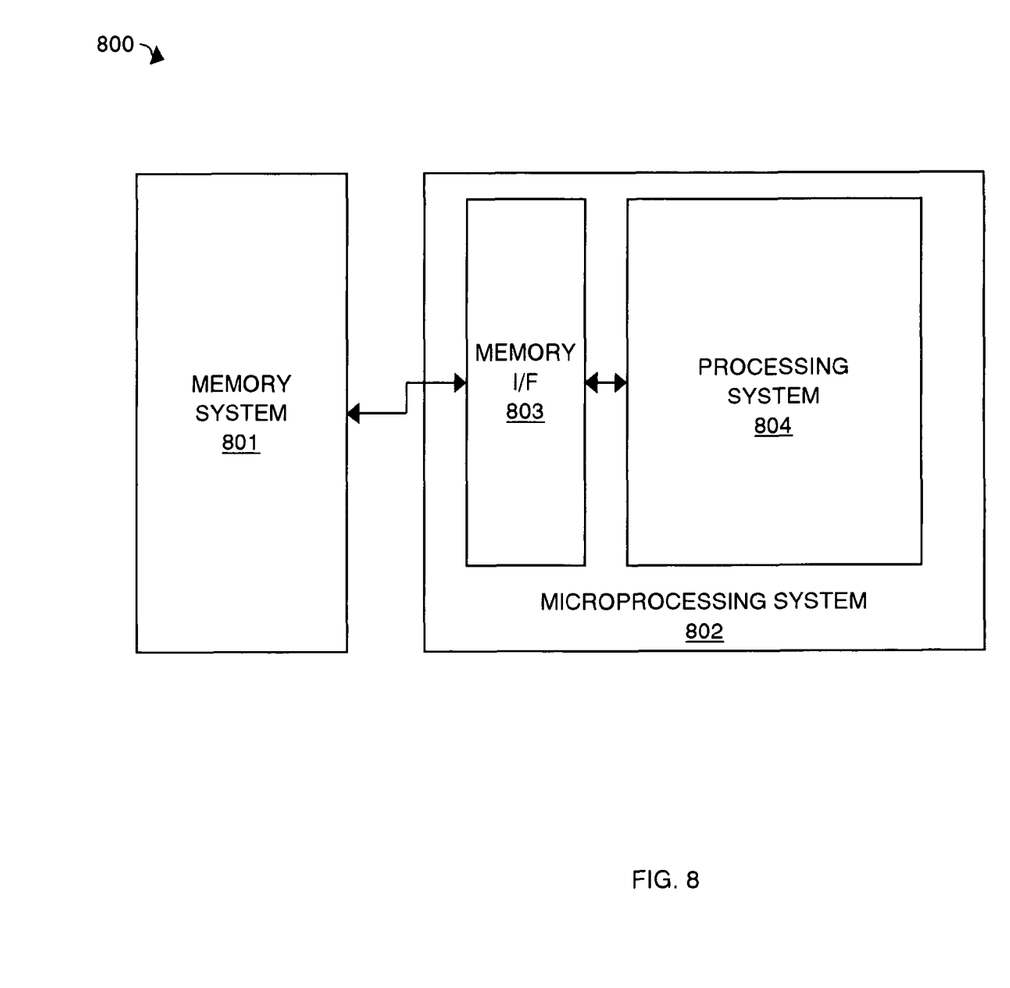
FIG. 8 illustrates a software protection system in an embodiment of the invention.

FIG. 8 illustrates a simplified block diagram of a software protection system 800 in an embodiment of the invention. Software protection system 800 includes memory system 801 and microprocessing system 802. Microprocessing system 802 includes memory interface 803 and processing system 804. Processing system 804 is operatively coupled to or otherwise in communication with memory system 801 via memory interface 803. Memory interface could comprise a logical or physical interface, or any combination thereof capable of interfacing information between memory system 801 and processing system 804.

Memory system 801 could be any memory system or collection of memory systems capable of storing software programs executable by processing system 804. Examples of memory systems include disk, tape, optical, integrated circuit, or server memory systems. Memory system 801 could be a local or external memory system. In an example, memory system 801 could comprise a random access memory, a hard drive, a cache memory, a flash memory, or a read-only memory, or any combination thereof. The software programs could be, for example, operating system, application, utility, networking, or driver programs, as well as other types of programs. The software programs could be comprised of program instructions executable by processing system 804. Most often, the programs could be in the form of an executable file. Often times, the software programs are stored in a binary representation of machine instructions executable by processing system 804. It should be understood that the programs could be stored in an intermediate form that could require the services of an interpreter.

Processing system 804 could comprise any system, module, or collection of systems or modules capable of processing software programs stored on memory system 801 to execute the software programs. Processing system 804 could be a programmable general purpose processing system. In another example, processing system 804 could be an application specific processing system. Processing system 804 could be comprised of an integrated circuit or collection of integrated circuits.

In operation, memory interface 803 retrieves program instructions from memory system 101 for processing and execution processing system 804. Typically, a software program contains a logical execution order. Memory interface 803 reads, fetches, or otherwise retrieves the program instructions according to the order. Processing system 804 processes and executes the program instructions. Memory interface 803 and processing system 804 could fetch and execute the program instructions one after another. However, memory interface 803 and processing system 804 could also fetch and execute several program instructions at once. Often times, a series of program instructions are executed sequentially. However, it is also well known that program instructions can cause jumps to other program instructions other than the following program instruction, as well as other operations that cause a program to execute in a non-sequential fashion.

An order identifier located in either memory interface 803 or processing system 804 is frequently used to track, point to, or otherwise indicate the current place or location of a program in its execution order. A program counter is an example of an order identifier. Often times, a program counter points to an address location in memory system 801 that stores or holds the next program instruction to be fetched by memory interface 803. In some cases, the program counter contains a value offset by a variable or constant amount. The program counter directs memory interface 803 from where to retrieve the next program instruction.

In an operational example, memory system 801 could store a software program comprised of a plurality of program instructions that, when executed, have a program order. Processing system 804 could determine a next program instruction of the plurality of program instructions in the program order based on an order identifier. In response, memory interface 803 could read, fetch, or otherwise retrieve the next program instruction from memory system 801. Processing system 804 could determine if the program instruction requires decrypting. If the program instruction requires decrypting, processing system 804 decrypts the program instruction. After decrypting the program instruction, processing system 804 executes the program instruction. If the program instruction does not require decryption, processing system bypasses decryption and executes the program instruction.

Microprocessing system 802 could be capable of operating in either a decryption mode or a non-decryption mode, as some software programs or program instructions may be encrypted, while others may not be encrypted.

In an embodiment, microprocessing system 802 could capable of determining its state or mode on a per-program instruction basis. For instance, a program instruction could include a flag set to indicate that the program instruction is either encrypted or unencrypted. In another example, the opcode of each program instruction could be analyzed to determine whether or not the opcode matches at least one of a group of opcode templates. Depending upon the result, it could be determined that the program instruction is either encrypted or decrypted. Other variations are possible.

In another embodiment, microprocessing system 802 could be capable of determining its state or mode on a per-software program or per-module basis. For example, an early program instruction of a software program being executed could indicate whether or not the software program as a whole is encrypted or unencrypted.

It should be understood that in some examples microprocessing system 802 could operate under the assumption that every software program or every program instruction is encrypted and therefore requires decrypting.

In another operational example, processing system 804 could determine the next program instruction based on an order identifier. Next, memory interface 803 could, read, fetch, or otherwise retrieve the next program instruction from memory system 801. It should be understood that retrieving the program instruction could include a well known pre-fetch process.

Processing system 804 then processes the program instruction to determine the encryption mode. In one example, the opcode could be a new opcode that instructs processing system 804 to enter into a decryption mode. For every program instruction thereafter, processing system 804 could decrypt the program instruction and then execute the decrypted program instruction. A subsequent program instruction could have an opcode instructing processing system 804 to exit the decryption mode. For every program instruction thereafter, decryption could be bypassed and the program instruction executed by processing system 804.

In yet another operational example, the operation of microprocessing system 802 with respect to program instruction 302 is described. Processing system 804 could determine the next program instruction based on an order identifier. Next, memory system 803 could read, fetch, or otherwise retrieve the next program instruction from memory system 801. It should be understood that retrieving the program instruction could include a pre-fetch process.

Processing system 804 then processes the program instruction to determine the encryption mode based on a flag set in the opcode of the program instructions. As illustrated in FIG. 3, the flag in program instruction 302 is the left most bit of the opcode. It should be understood that the flag could a different bit or group of multiple bits in either the opcode or even the operand.

In one example, the flag could represent an encrypted state of the program instruction. In such an example, each program instruction would be processed to determine the state of each program instruction. If a flag indicates that the program instruction is encrypted, then the program instruction is decrypted. After decryption, the program instruction is executed. If the flag indicates that the program instruction is not encrypted, then the decryption step is bypassed and the program instruction is executed.

In another example, the flag could represent that a particular software program as a whole, or a section or subset of a software program, is encrypted. The flag could place microprocessing system 802 into a decryption mode while the software program is being executed. In the event of an interrupt by another program, the mode of the previous program could be pushed onto a stack. Once the previous program is again current and being executed, the mode could be popped off the stack. The stack could be located in memory interface 803, processing system 804, or some other element within microprocessing system 802. The stack could also be located or stored in memory system 801. Microprocessing system 802 could then operate in accordance with the mode, such as in a decryption mode or a normal mode.

In an example of an encryption process, program instructions could be encrypted on a per-program instruction basis. In this example, a program instruction is encrypted if the opcode of the program instruction does not match at least one opcode included in an opcode template. The program instructions having opcodes that match at least one opcode in an opcode template remain unencrypted. A software program could be encrypted on a per-program instruction basis prior to loading onto memory system 801. At run-time, microprocessing system 802 could retrieve and decrypt the program instructions of the software program on a per-program instruction basis, and based on the opcodes of the program instructions.

In an example of a decryption process, program instructions could be decrypted on a per-program instruction basis and based on the opcodes of the respective program instructions.

In yet another operational example, the operation of microprocessing system 802 with respect to program instruction 301 and the above mentioned encryption process is provided. Processing system 804 could determine the next program instruction based on an order identifier. Next, memory interface 803 reads, fetches, or otherwise retrieves the next program instruction from memory system 801. It should be understood that retrieving the next program instructions could include a pre-fetch process.

Processing system 804 then processes the program instruction to determine whether or not the opcode in the program instruction is included in a template having a group of opcodes. The template could be stored in a memory location within processing system 804, such as on a register or registers, cache memory, or the like. The template could include a group of opcodes in an unencrypted state. The program instructions fetched from memory system 801 could be part of a software program previously encrypted by an encryption process, such as the process described above. The encryption process could encrypt the software program on an opcode by opcode basis. For instance, some program instructions could be encrypted based on the opcode, while other program instructions having different opcodes could remain unencrypted.

If the opcode is not in the template, then processing system 804 could decrypt the program instruction and then execute the program instruction. If the opcode is in the template, then the decryption step could be bypassed and the program instruction executed.

Figure 9:
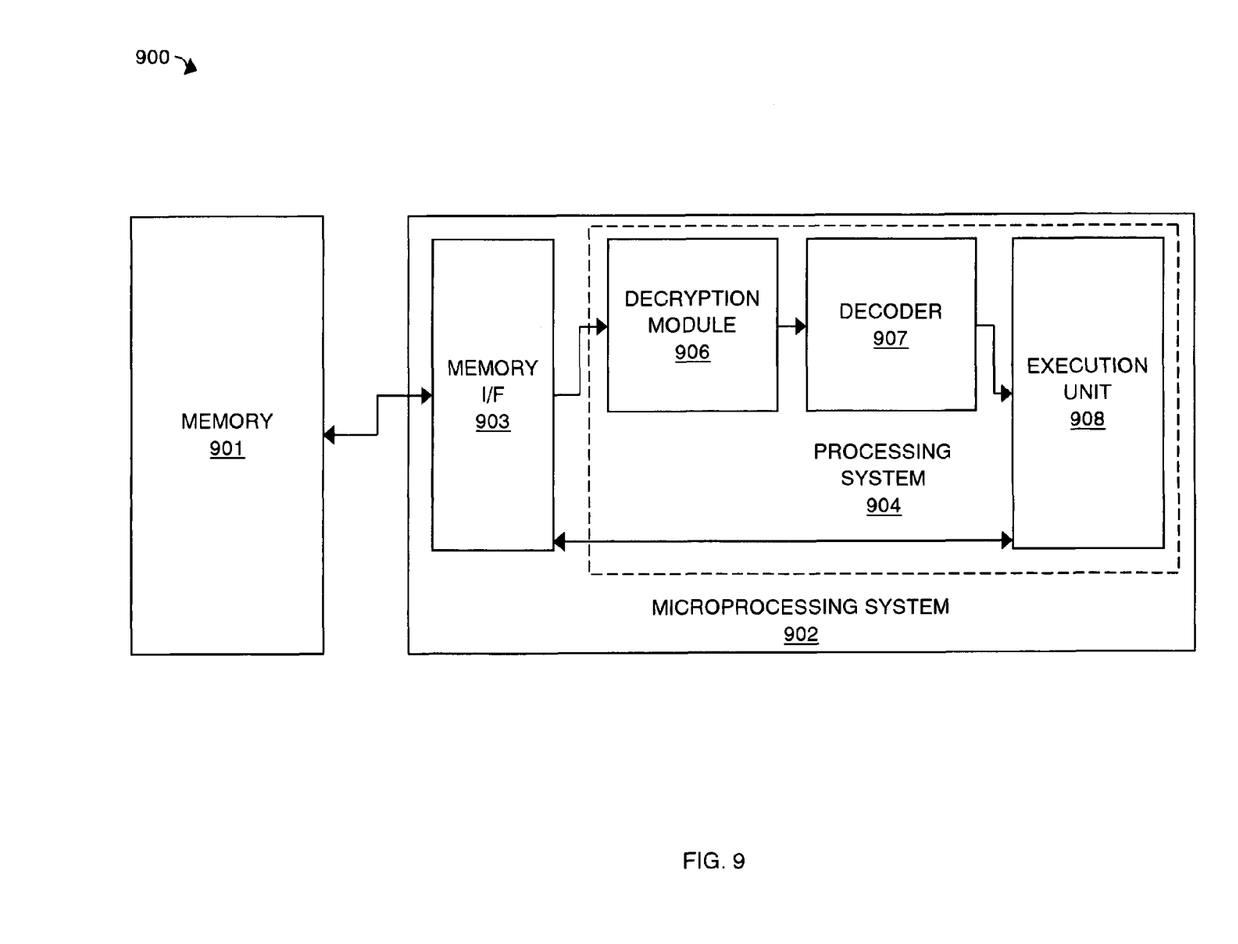
FIG. 9 illustrates a software protection system in an embodiment of the invention.

FIG. 9 illustrates a simplified block diagram of a software protection system 900 in an embodiment of the invention. Software protection system 900 includes memory system 901 and microprocessing system 902. Microprocessing system 902 includes memory interface 903 and processing system 904. Processing system 904 includes decryption module 906, decoder 907, and execution unit 908. Decryption module 906 is operatively coupled to or otherwise in communication with memory system 901 via memory interface 903. Likewise, execution unit 908 is operatively coupled to or otherwise in communication with memory system 901 via memory interface 903. Memory interface 903 could comprise a logical or physical interface, or any combination thereof capable of interfacing information between memory system 901 and execution unit 908, and between memory system 901 and decryption module 906.

Memory system 901 could be any memory system or collection of memory systems capable of storing software programs executable by processing system 904. Examples of memory systems include disk, tape, optical, integrated circuit, or server memory systems. Memory system 901 could be a local or external memory system. In an example, memory system 901 could comprise a random access memory, a hard drive, a cache memory, a flash memory, or a read-only memory, or any combination thereof. The software programs could be, for example, operating system, application, utility, networking, or driver programs, as well as other types of programs. The software programs could be comprised of program instructions executable by processing system 904. Most often, the programs could be in the form of an executable file. Often times, the software programs are stored in a binary representation of machine instructions executable by processing system 904. It should be understood that the programs could be stored in an intermediate form that could require the services of an interpreter.

Processing system 904 could comprise any system, module, or collection of systems or modules capable of processing software programs stored on memory system 901 to execute the software programs. Processing system 904 could be a programmable general purpose processing system. In another example, processing system 904 could be an application specific processing system. Processing system 904 could be comprised of an integrated circuit or collection of integrated circuits.

Decryption module 906 could be any module, system, or collection of modules or systems capable of receiving program instructions from memory interface 903 and decryption the program instructions. Decryption module 906 could also be capable of determining whether or not program instructions require decrypting.

Decoder 907 could be any module, system, or collection of modules or systems capable of receiving program instructions from decryption module 906 and decoding the program instructions into a form suitable for execution by execution unit 908. Decoders are well known in the art.

Execution unit 908 could be any module, system, or collection of modules or systems capable of executing decoded program instructions. Execution units are well known in the art.

In operation, memory interface 903 retrieves program instructions from memory system 901 for processing and execution by processing, system 902, and in particular, by decryption module 906, decoder 907, and execution unit 908. Typically, a software program contains a logical execution order. Memory interface 903 reads, fetches, or otherwise retrieves the program instructions according to the order. Processing system 904 processes and executes the program instructions. Memory interface 903 and processing system 904 could fetch and execute the program instructions one after another. However, memory interface 903 and processing system 904 could also fetch and execute several program instructions at once. Often times, a series of program instructions are executed sequentially. However, it is also well known that program instructions can cause jumps to other program instructions other than the following program instruction, as well as other operations that cause a program to execute in a non-sequential fashion.

An order identifier located in either memory interface 903 or within an element of processing system 904 is frequently used to track, point to, or otherwise indicate the current place or location of a program in its execution order. A program counter is an example of an order identifier. Often times, a program counter points to an address location in memory system 901 that stores or holds the next program instruction to be fetched by memory interface 903. In some cases, the program counter contains a value offset by a variable or constant amount. The program counter directs memory interface 903 from where to retrieve the next program instruction.

In an operational example, memory system 901 could store a software program comprised of a plurality of program instructions that, when executed, have a program order. Memory interface 903, in conjunction with execution unit 908, could determine a next program instruction of the plurality of program instructions in the program order based on an order identifier. In response, memory interface 903 could read, fetch, or otherwise retrieve the next program instruction from memory system 901. Decryption module 906 could determine if the program instruction requires decrypting. If the program instruction requires decrypting, decryption module 906 decrypts the program instruction. After decrypting the program instruction, decoder 907 receives the program instruction from decryption module 906 and decodes the decrypted program instruction into a form suitable for processing by execution unit 908. Execution unit 908 then executes the program instruction. If the program instruction does not require decryption, decryption module 906 bypasses decryption and transfer the unencrypted program instruction to decoder 907. Decoder 907 then decodes the program instruction and execution unit 908 executes the decoded program instruction.

Microprocessing system 902 could be capable of operating in either a decryption mode or a non-decryption mode, as some software programs or program instructions may be encrypted, while others may not be encrypted.

In an embodiment, microprocessing system 902 could capable of determining its state or mode on a per-program instruction basis. For instance, a program instruction could include a flag set to indicate that the program instruction is either encrypted or unencrypted. In another example, the opcode of each program instruction could be analyzed to determine whether or not the opcode matches at least one of a group of opcode templates. Depending upon the result, it could be determined that the program instruction is either encrypted or decrypted. Other variations are possible.

In another embodiment, microprocessing system 902 could be capable of determining its state or mode on a per-software program or per-module basis. For example, an early program instruction of a software program being executed could indicate whether or not the software program as a whole is encrypted or unencrypted.

It should be understood that in some examples microprocessing system 902 could operate under the assumption that every software program or every program instruction is encrypted and therefore requires decrypting.

In another operational example, processing system 904 could determine the next program instruction based on an order identifier. Next, memory interface 903 could, read, fetch, or otherwise retrieve the next program instruction from memory system 901. It should be understood that retrieving the program instruction could include a well known pre-fetch process.

Decryption module 906 then processes the program instruction to determine the encryption mode. In one example, the opcode could be a new opcode that instructs decryption module to enter into a decryption mode. For every program instruction thereafter, decryption module 906 could decrypt the program instruction and pass the decrypted program instruction to decoder 907 for decoding. Execution unit 908 could then execute the decoded program instruction. A subsequent program instruction could have an opcode instructing decryption module 906 to exit the decryption mode. For every program instruction thereafter, decryption module 906 bypasses the decryption process and transfer program instructions to decoder 907 for decoding. Execution unit 908 could then execute the decoded program instruction.

In yet another operational example, the operation of microprocessing system 902 with respect to program instruction 302 is described. Processing system 904 could determine the next program instruction based on an order identifier. Next, memory system 903 could read, fetch, or otherwise retrieve the next program instruction from memory system 901. It should be understood that retrieving the program instruction could include a pre-fetch process.

Decryption module 906 then processes the program instruction to determine the encryption mode based on a flag set in the opcode of the program instructions. As illustrated in FIG. 3, the flag in program instruction 302 is the left most bit of the opcode. It should be understood that the flag could a different bit or group of multiple bits in either the opcode or even the operand.

In one example, the flag could represent an encrypted state of the program instruction. In such an example, each program instruction would be processed to determine the state of each program instruction. If a flag indicates that the program instruction is encrypted, then the program instruction is decrypted. After decryption, the program instruction is decoded by decoder 907 and executed by execution unit 908. If the flag indicates that the program instruction is not encrypted, then the decryption step is bypassed and the program instruction is decoded and executed.

In another example, the flag could represent that a particular software program as a whole, or a section or subset of a software program, is encrypted. The flag could place microprocessing system 902 into a decryption mode while the software program is being executed. In the event of an interrupt by another program, the mode of the previous program could be pushed onto a stack. Once the previous program is again current and being executed, the mode could be popped off the stack. The stack could be located in memory interface 903, decoder module 906, decoder 907, or execution unit 908, as well as in other elements of processing system 904, as well as in some other element within microprocessing system 902. The stack could also be located or stored in memory system 901. Microprocessing system 902 could then operate in accordance with the mode, such as in a decryption mode or a normal mode.

In an example of an encryption process, program instructions could be encrypted on a per-program instruction basis. In this example, a program instruction is encrypted if the opcode of the program instruction does not match at least one opcode included in an opcode template. The program instructions having opcodes that match at least one opcode in an opcode template remain unencrypted. A software program could be encrypted on a per-program instruction basis prior to loading onto memory system 901. At run-time, microprocessing system 902 could retrieve and decrypt the program instructions of the software program on a per-program instruction basis, and based on the opcodes of the program instructions.

In an example of a decryption process, program instructions could be decrypted on a per-program instruction basis and based on the opcodes of the respective program instructions.

In yet another operational example, the operation of microprocessing system 902 with respect to program instruction 301 and the above mentioned encryption process is provided. Processing system 904 could determine the next program instruction based on an order identifier. Next, memory interface 903 reads, fetches, or otherwise retrieves the next program instruction from memory system 901. It should be understood that retrieving the next program instructions could include a pre-fetch process.

Decryption module 906 then processes the program instruction to determine whether or not the opcode in the program instruction is included in a template having a group of opcodes. The template could be stored in a memory location within processing system 904, such as on a register or registers, cache memory, or the like. The template could include a group of opcodes in an unencrypted state. The program instructions fetched from memory system 901 could be part of a software program previously encrypted by an encryption process, such as the process described above. The encryption process could encrypt the software program on an opcode by opcode basis. For instance, some program instructions could be encrypted based on the opcode, while other program instructions having different opcodes could remain unencrypted.

If the opcode is not in the template, then decryption module 906 could decrypt the program instruction and pass the decrypted program instruction to decoder 907 for decoding. Execution unit 908 could then execute the decoded program instruction. If the opcode is in the template, then the decryption step could be bypassed and the program instruction decoded and executed.

Figure 10:
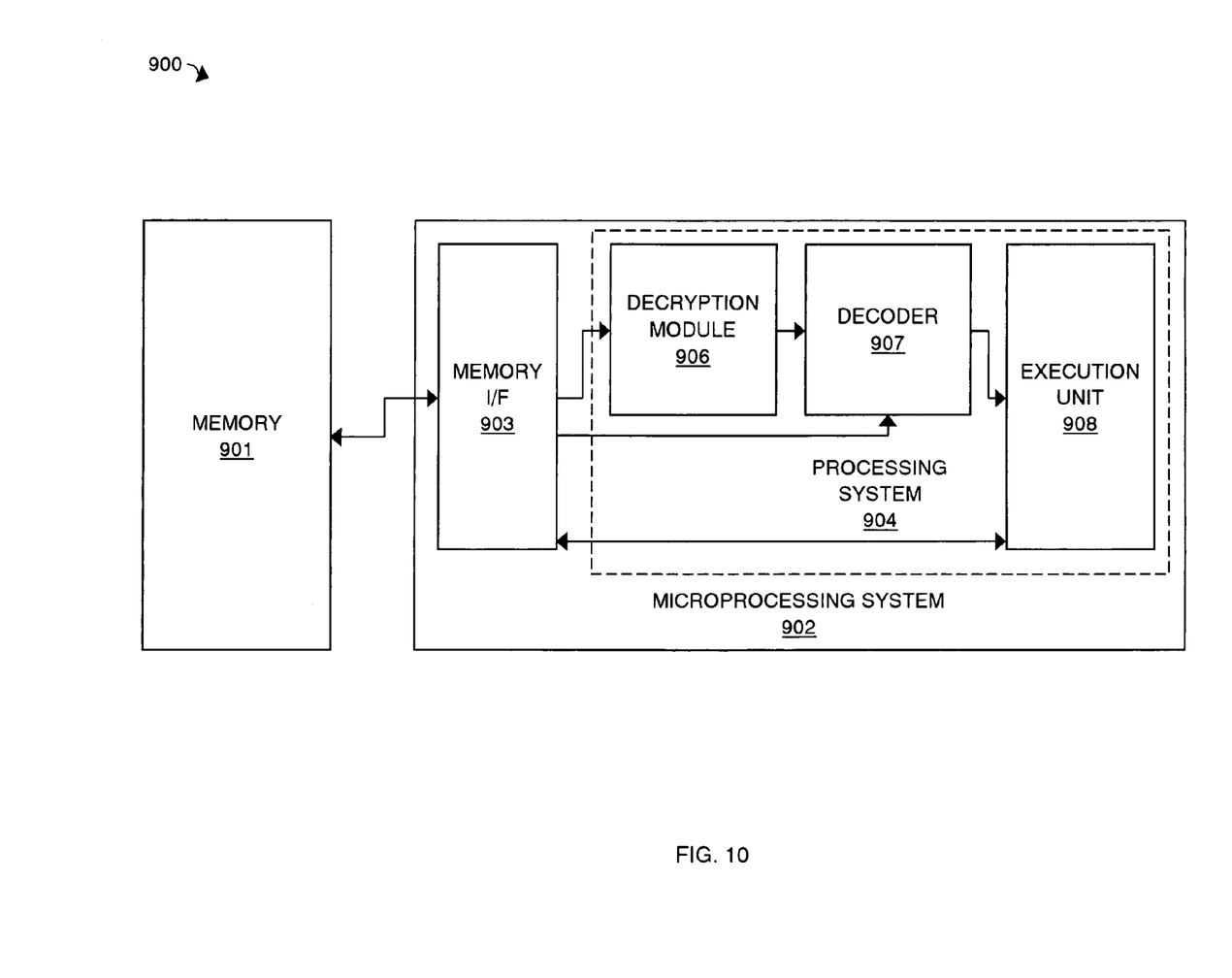
FIG. 10 illustrates a software protection system in an embodiment of the invention.

As illustrated in FIG. 10, decoder 907 could be operatively coupled to or in communication with memory interface 903. In this manner, the determination of whether or not a program instruction requires decrypting could be made prior to transferring a program instruction from memory interface 903 to decryption module 906. Rather, if decrypting is not required, a program instruction could be transferred from memory interface 903 to decoder 907, thereby bypassing decryption module 906.

Figure 11:
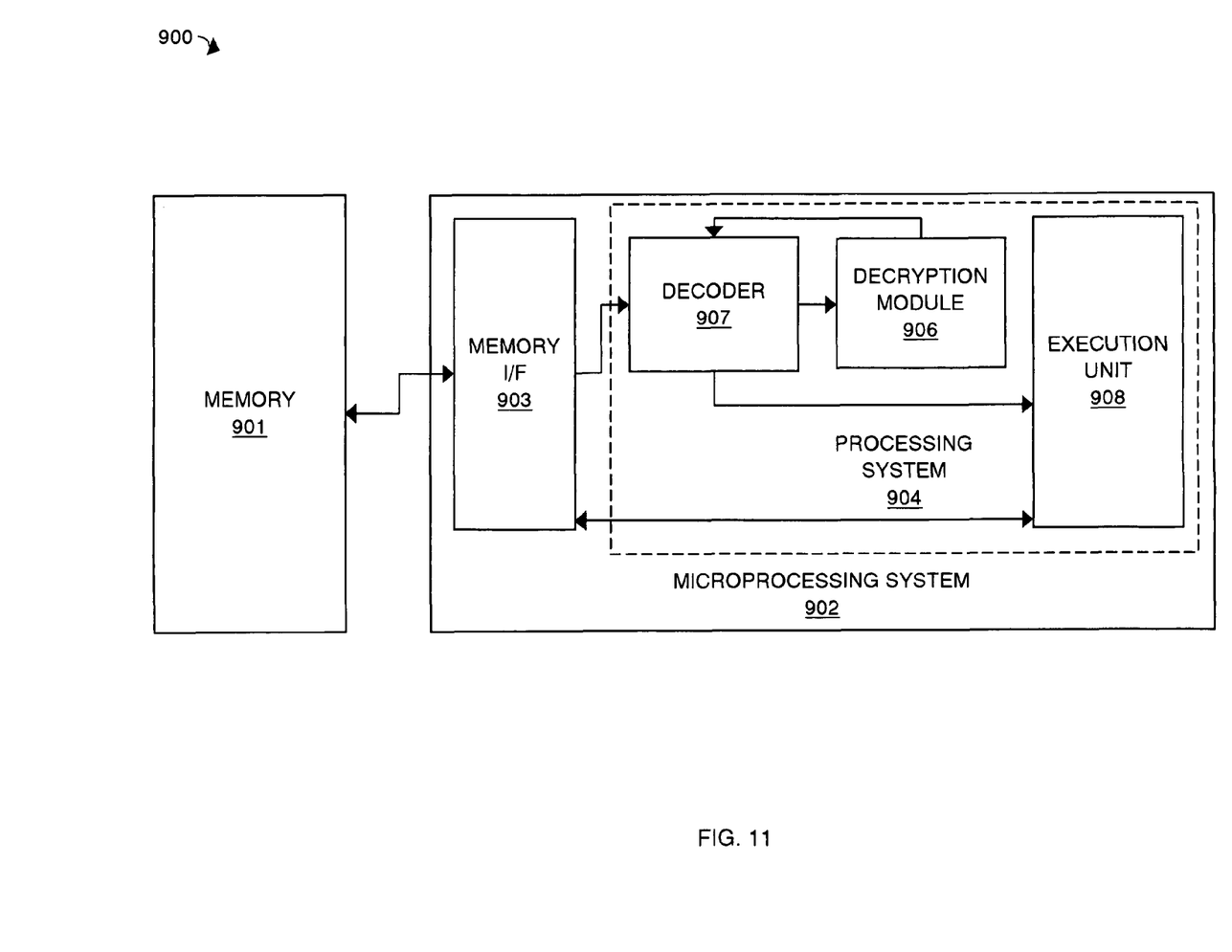
FIG. 11 illustrates a software protection system in an embodiment of the invention.

As illustrated in FIG. 11, decoder 907 could be operatively coupled to or in communication with memory interface 903. Decryption module 906 could be placed between decoder 907 and execution unit 908. In this manner, decoder 907 could receive program instructions from memory interface 903 and determine whether or not a program instruction requires decrypting. If a program instruction requires decrypting, decoder 907 could pass the program instruction to decryption module 906. Decryption module 906 could decrypt the program instruction and return the decrypted program instruction to decoder 907. Decoder 907 could then decode the program instruction and transfer the decoded and decrypted program instruction to execution unit 908. In a case where the program instruction does not require decrypting, decoder 907 could decode the program instruction and pass the decoded program instruction to execution unit 908 for execution.

It should be understood that FIGS. 1-11 and the above description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described above can be combined in various ways to form multiple embodiments of the invention. As a result, the invention is not limited to the specific embodiments described above, but only by the claims and their equivalents.

What is claimed is:

1. A software protection system comprising:
    a memory system configured to store a software program comprised of a plurality of program instructions each comprising an opcode and an operand, wherein the plurality of program instructions, when executed, have a program order; and
    a microprocessing system coupled to the memory system and configured to, when executing the software program, determine a next program instruction of the plurality of program instructions in the program order based on an order identifier, fetch the next program instruction from the memory system, compare the opcode of the next program instruction against a template comprising a group of unencrypted opcodes to determine if the next program instruction requires decrypting, decrypt the next program instruction responsive to determining that the next program instruction requires decrypting, and execute the next program instruction.

2. The software protection system of claim 1 wherein a first program instruction of the plurality of program instructions comprises an encryption flag indicating whether the software program is encrypted or unencrypted.

3. The software protection system of claim 2 wherein the microprocessing system is further configured to process the encryption flag of the first program instruction to determine if the next program instruction requires decrypting.

4. The software protection system of claim 1 wherein each of the opcodes of the plurality of program instructions include an encryption flag that indicates whether the associated program instruction is either encrypted or unencrypted.

5. The software protection system of claim 4 wherein the microprocessing system is further configured to process the encryption flag of the opcode of the next program instruction to determine if the next program instruction requires decrypting.

6. The software protection system of claim 1 wherein the next program instruction does not require decrypting if the opcode matches one of the group of unencrypted opcodes in the template.

7. The software protection system of claim 1 wherein the next program instruction requires decrypting if the opcode does not match one of the group of unencrypted opcodes in the template.

8. A method of operating a software protection system comprising:
   storing in a memory system a software program comprised of a plurality of program instructions each comprising an opcode and an operand, wherein the plurality of program instructions, when executed, have a program sequence; and
   when executing the software program in a microprocessing system:
      determining in a microprocessing system a next program instruction of the plurality of program instructions in the program sequence based on a sequence identifier;
      fetching the next program instruction from the memory system;
      comparing the opcode of the next program instruction against a template comprising a group of unencrypted opcodes to determine if the next program instruction requires decrypting;
      decrypting the next program instruction responsive to determining that the next program instruction requires decrypting; and
      executing the next program instruction.

9. The method of claim 8 wherein a first program instruction of the plurality of program instructions comprises an encryption flag indicating whether the software program is encrypted or unencrypted.

10. The method of claim 9, further comprising:
   processing the encryption flag of the first program instruction to determine if the next program instruction requires decrypting.

11. The method of claim 8 wherein each of the opcodes of the plurality of program instructions include an encryption flag that indicates whether the associated program instruction is either encrypted or unencrypted.

12. The method of claim 11, further comprising:
   processing the encryption flag of the opcode of the next program instruction to determine if the next program instruction requires decrypting.

13. The method of claim 8 wherein the next program instruction does not require decrypting if the opcode matches one of the group of unencrypted opcodes in the template.

14. The method of claim 8 wherein the next program instruction requires decrypting if the opcode does not match one of the group of unencrypted opcodes in the template.

15. A microprocessing system for executing a software program comprised of a plurality of program instructions each comprising an opcode and an operand, wherein the plurality of program instructions, when executed, have a program order, the microprocessing system comprising:
   an interface configured to read from a memory a first program instruction of the plurality of program instructions;
   a processing system coupled to the interface and configured to
   compare an opcode of the program instruction against a template comprising a group of unencrypted opcodes to determine if the program instruction requires decrypting, decrypt the program instruction responsive to determining that the program instruction requires decrypting, and execute the program instruction.

16. A method of operating a microprocessing system for executing a software program comprised of a plurality of program instructions each comprising an opcode and an operand, wherein the plurality of program instructions, when executed, have a program order, the method comprising:
   reading a program instruction of the plurality of program instructions from a memory;
   comparing an opcode of the program instruction against a template comprising a group of unencrypted opcodes to determine if the program instruction requires decrypting;
   decrypting the program instruction responsive to determining that the program instruction requires decrypting; and
   executing the program instruction.

17. The microprocessing system of claim 15,
   wherein the program instruction does not require decrypting if the opcode matches one of the group of unencrypted opcodes in the template.

18. The method of operating a microprocessing system of claim 16,
   wherein the program instruction requires decrypting if the opcode does not match one of the group of unencrypted opcodes in the template.

* * * * *